United States Patent
Joung et al.

(10) Patent No.: US 9,495,176 B2
(45) Date of Patent: Nov. 15, 2016

(54) MOBILE TERMINAL AND CONTROL METHOD THEREOF USING EXTRACTED KEYWORDS

(71) Applicant: LG ELECTRONICS INC., Seoul (KR)

(72) Inventors: Wonseok Joung, Seoul (KR); Dami Choe, Seoul (KR); Hyungsup Kim, Seoul (KR); Jungmin Park, Seoul (KR); Yongkyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

(21) Appl. No.: 13/947,913

(22) Filed: Jul. 22, 2013

(65) Prior Publication Data

US 2014/0258182 A1  Sep. 11, 2014

(30) Foreign Application Priority Data

Mar. 6, 2013 (KR) .................. 10-2013-0024066

(51) Int. Cl.
  *G06F 17/00* (2006.01)
  *G06F 9/44* (2006.01)
  *G06F 17/30* (2006.01)

(52) U.S. Cl.
  CPC ....... *G06F 9/4448* (2013.01); *G06F 17/30943* (2013.01); *G06F 9/4443* (2013.01)

(58) Field of Classification Search
  None
  See application file for complete search history.

(56) References Cited

U.S. PATENT DOCUMENTS

| | | | |
|---|---|---|---|
| 7,603,349 B1* | 10/2009 | Kraft et al. | |
| 2005/0080764 A1* | 4/2005 | Ito | G06F 17/30696 |
| 2007/0061299 A1* | 3/2007 | Chisaka | H04H 60/72 |
| 2009/0006333 A1 | 1/2009 | Jones et al. | |
| 2010/0306808 A1* | 12/2010 | Neumeier | H04N 5/44591 725/105 |
| 2013/0006957 A1* | 1/2013 | Huang et al. | 707/706 |
| 2013/0024882 A1* | 1/2013 | Lee | G06Q 30/0207 725/23 |
| 2013/0066902 A1* | 3/2013 | Iida | G06F 17/30864 707/769 |
| 2013/0097173 A1* | 4/2013 | Stovicek et al. | 707/741 |
| 2014/0173003 A1* | 6/2014 | Van | H04L 67/306 709/206 |
| 2015/0161246 A1* | 6/2015 | Liu | 707/722 |

FOREIGN PATENT DOCUMENTS

WO  WO 2004/012431 A1  2/2004

OTHER PUBLICATIONS

Gui et al., "A Contextualized and Personalized Approach for Mobile Search," 2009 International Conference on Advanced Information Networking and Applications Workshops, 2009, IEEE, pp. 966-971.

* cited by examiner

*Primary Examiner* — Li-Wu Chang
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a display unit configured to display screen information in a first region, and display an indicator area in a second region adjacent to the first region; and a controller configured to extract at least one keyword data included the displayed screen information, perform a search operation using the extracted keyword data, and display a result of the search operation in the second region.

18 Claims, 17 Drawing Sheets

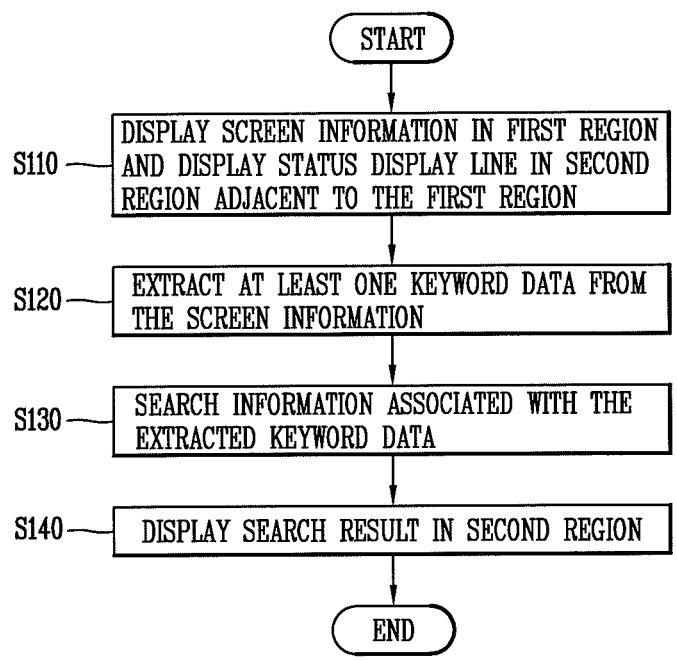

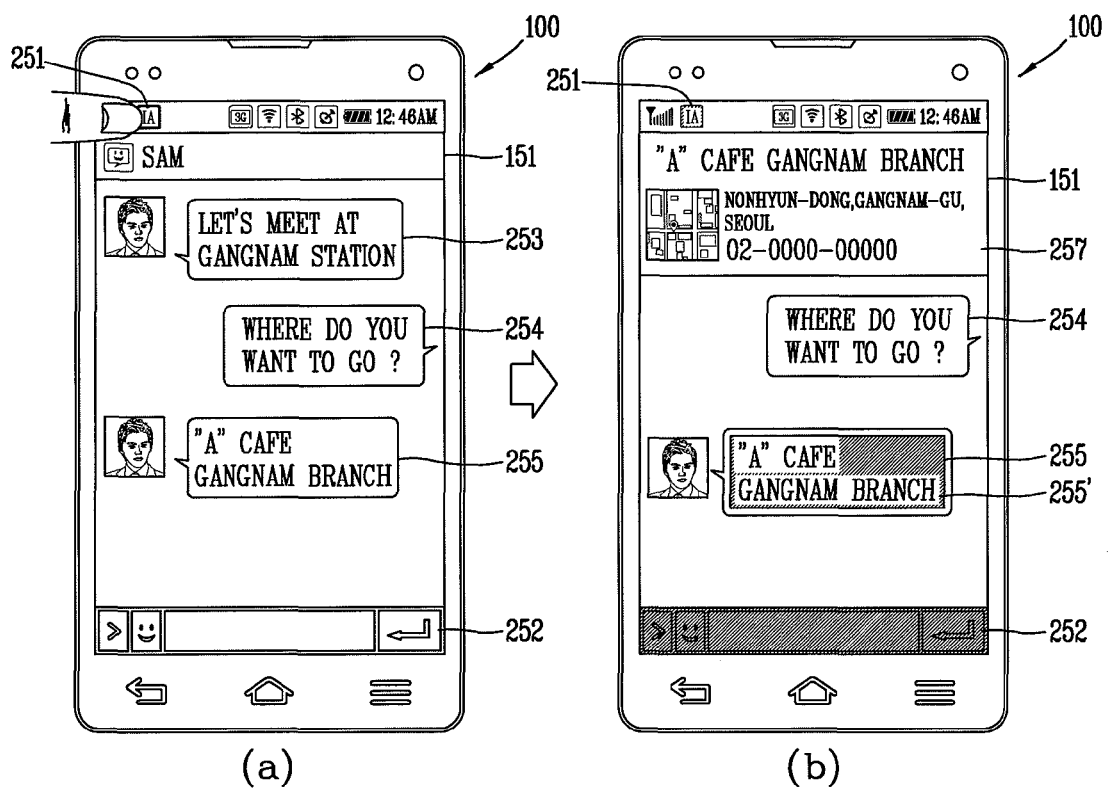

MOBILE TERMINAL AND CONTROL METHOD THEREOF USING EXTRACTED KEYWORDS

CROSS-REFERENCE TO A RELATED APPLICATION

Pursuant to 35 U.S.C. §119(a), this application claims the benefit of earlier filing date and right of priority to Korean Application No. 10-2013-0024066, filed on Mar. 6, 2013, the contents of which is incorporated by reference herein in its entirety.

BACKGROUND OF THE INVENTION

Field of the Invention

The present invention relates to a mobile terminal and corresponding control method for extracting and searching for keyword information displayed on a display screen.

Description of the Related Art

Terminals can be classified into two types, such as a mobile or portable terminal and a stationary terminal. The mobile terminal can also be classified into two types, such as a handheld terminal and a vehicle mount terminal. Terminals are also multifunctional and can capture still images or moving images, play music or video files, play games, receive broadcast and the like. However, the user has to perform several input operations to use the different functions on the terminal.

SUMMARY OF THE INVENTION

Thus, one object of the present invention is to provide a mobile terminal and control method thereof allowing the user can control a search application in a simple manner while displaying screen information.

To achieve these and other advantages and in accordance with the purpose of the present invention, as embodied and broadly described herein, the present invention provides in one aspect a mobile terminal including a wireless communication unit configured to wirelessly communicate with at least one other terminal; a display unit configured to display screen information in a first region, and display an indicator area in a second region adjacent to the first region; and a controller configured to extract at least one keyword data included the displayed screen information, perform a search operation using the extracted keyword data, and display a result of the search operation in the second region. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a flow chart illustrating a method of controlling mobile terminal according to an embodiment of the present invention;

FIGS. 5 and 6 are conceptual views illustrating a user interface for activating a function of extracting keyword data from screen information;

DETAILED DESCRIPTION OF THE INVENTION

Figure 1:
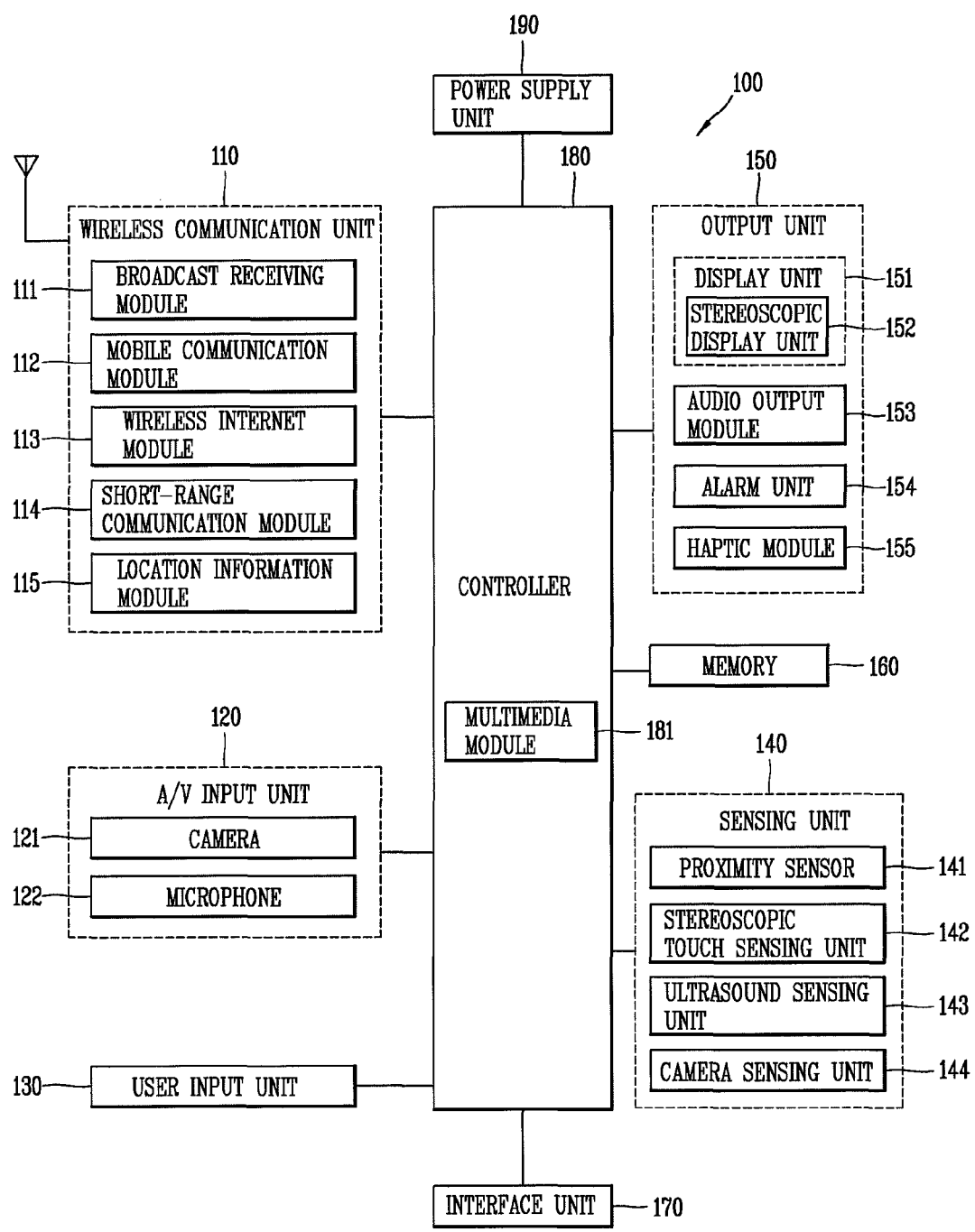
FIG. 1 is a block diagram illustrating a mobile terminal according to an embodiment of the present invention.

Hereinafter, embodiments of the present invention will be described in detail with reference to the accompanying drawings, and the same or similar elements are designated with the same numeral references regardless of the numerals in the drawings and their redundant description will be omitted.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment of the present invention. The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. Further, the mobile communication terminal may be implemented with greater or less number of elements than those illustrated elements.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for all broadcast system transmitting broadcast signals as well as the digital broadcasting systems. Broadcast signals and/or broadcast associated information received via the broadcast receiving module 111 may also be stored in the memory 160.

In addition, the mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. Further, the mobile communication module 112 may be configured to transmit or receive at least one of audio or video data to implement the video communication mode and voice communication mode.

In addition, the wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

Also, the short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFi) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

In addition, the sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100.

For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image. Here, stereoscopic image indicates a 3-dimensional stereoscopic image, and the 3-dimensional stereoscopic image is an image allowing the user to feel the gradual depth and reality of an object located on the monitor or screen as in a real space.

In addition, the 3-dimensional stereoscopic image may be implemented by using binocular disparity. That is, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, a thumbnail denotes a reduced image or reduced still video. The left and right thumbnail images generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit. The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 senses which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

Further, the proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this instance, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include the proximity sensor 141, a stereoscopic touch sensing unit 142, an ultrasound sensing unit 143, and a camera sensing unit 144. The proximity sensor 141 measures a distance between the sensing object (for example, the user's finger or stylus pen) and a detection surface to which a touch is applied using an electromagnetic field or infrared rays without a mechanical contact.

The terminal can then recognize which portion of a stereoscopic image has been touched by using the measured distance. In particular, when the touch screen is implemented with a capacitance type, the proximity level of a sensing object is sensed by changes of an electromagnetic field according to the proximity of the sensing object to recognize a 3-dimensional touch using the proximity level.

Further, the stereoscopic touch sensing unit 142 may be configured to sense the strength or duration time of a touch applied to the touch screen. For example, the stereoscopic touch sensing unit 142 senses a user applied touch pressure, and if the applied pressure is strong, then the stereoscopic touch sensing unit 142 recognizes it as a touch for an object located farther from the touch screen.

In addition, the ultrasound sensing unit 143 may be configured to sense the location of the sensing object using ultrasound. For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

Also, the camera sensing unit 144 may include at least one of a camera 121, a photo sensor, and a laser sensor. For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

In another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

In addition, the audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may also include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

Further, the haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

In addition, the haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may also be configured to transmit tactile effects through a user's direct contact, or a user's muscular sense using a finger or a hand. The haptic module 155 may be implemented in two or more in number according to the configuration of the mobile terminal 100.

In addition, the memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal 100 with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 includes a multimedia module 181 which provides multimedia playback. The multimedia module 181 may be configured as part of the controller 180 or as a separate component. Furthermore, the controller 180 can perform a pattern recognition processing so as to recognize writing or drawing input performed on the touch screen as text or image.

The controller 180 also implement a lock state for limiting the user's control command input to applications when the state of the mobile terminal satisfies a pre-set condition. Furthermore, the controller 180 control a lock screen displayed in the lock state based on a touch input sensed through the display unit 151 in the lock state. In addition, the power supply unit 190 receives external and internal power to provide power required for various components under the control of the controller 180.

Various embodiments described herein may be implemented in a computer or similar device readable medium using software, hardware, or any combination thereof. For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For a software implementation, the embodiments such as procedures or functions described in the present invention may be implemented with separate software modules. Each of the software modules may perform at least one function or operation described in the present invention. Software codes can be implemented by a software application written in any suitable programming language. The software codes may be stored in the memory 160 and executed by the controller 180.

Next, a communication system that can be implemented through the mobile terminal 100 according to the present invention will be described. In particular, FIGS. 2A and 2B are conceptual views illustrating a communication system in which a mobile terminal 100 according to the present invention is operable.

Figure 2A:
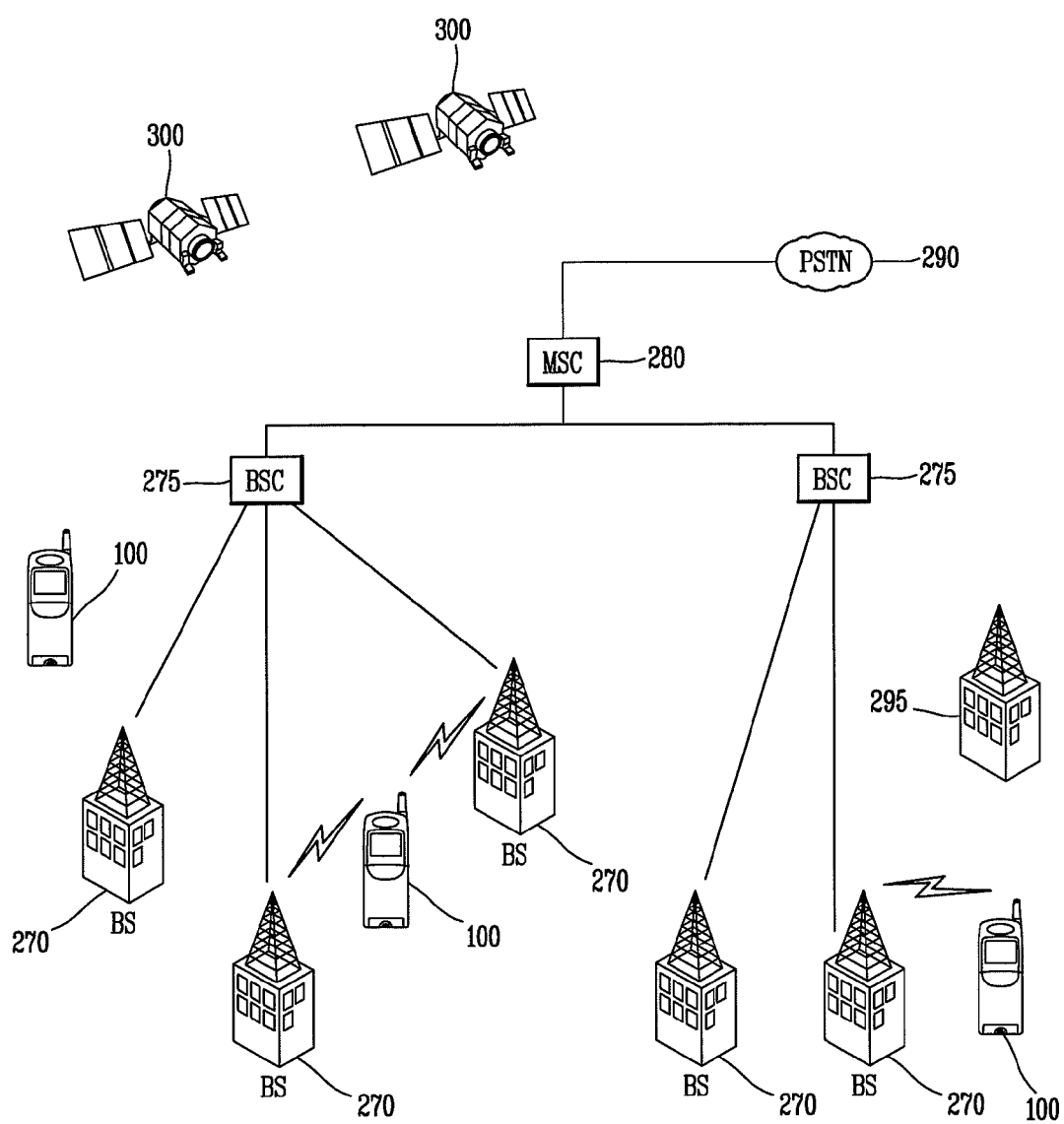
FIGS. 2A and 2B are conceptual views illustrating a communication system in which a mobile terminal according to the present invention is operable.
Figure 2B:
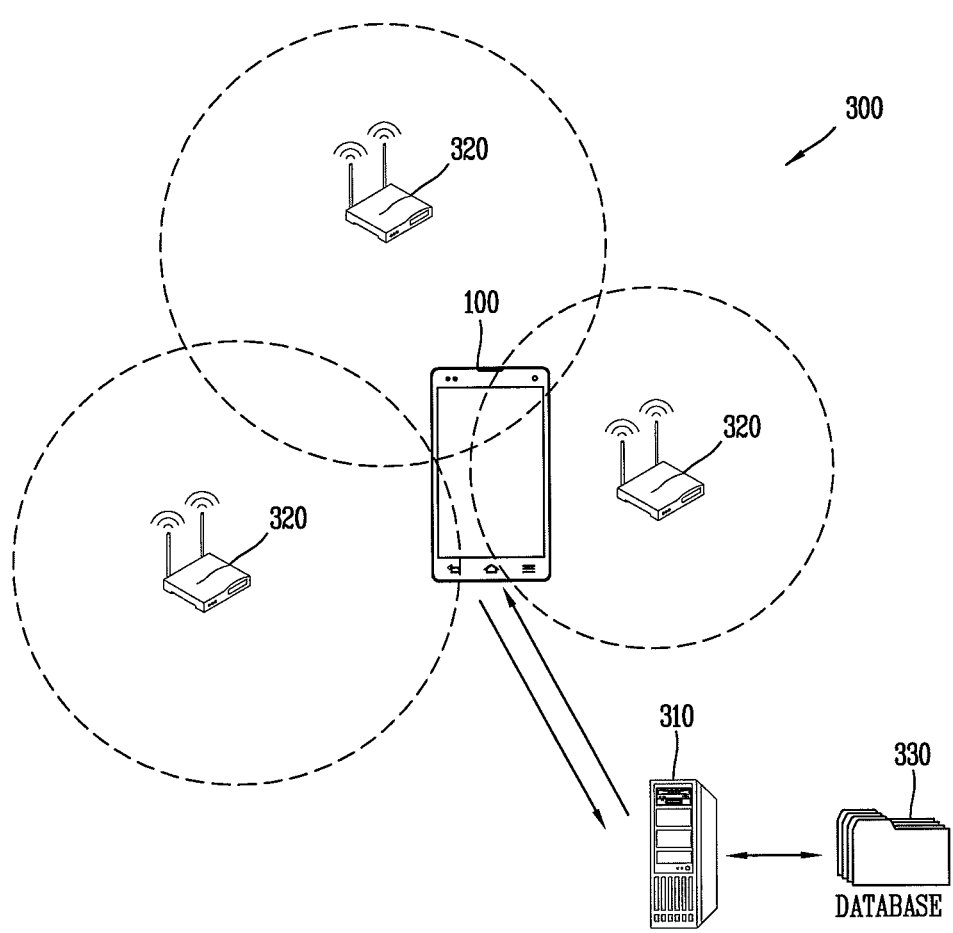

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this instance, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270.

Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

In addition, the WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

Further, the information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Figure 3A:
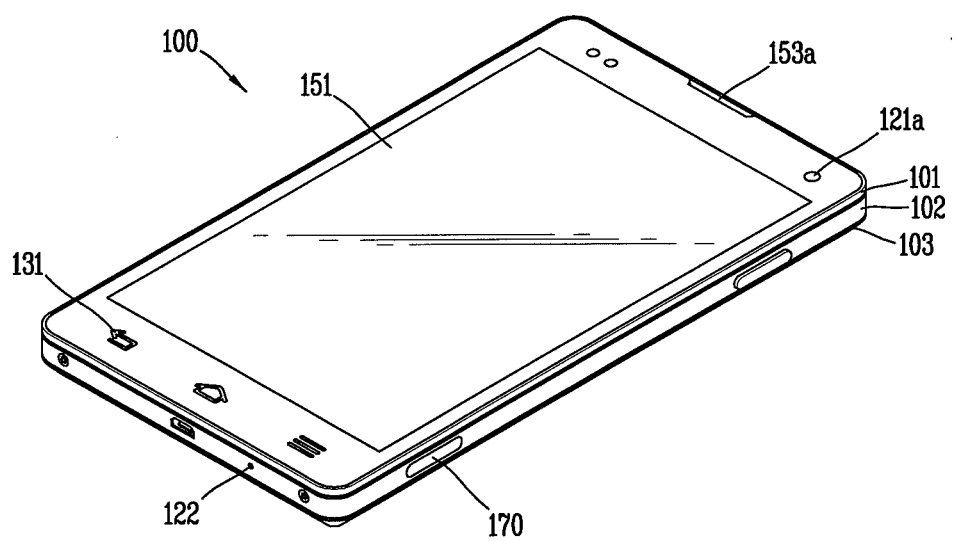
FIG. 3A is a front perspective view illustrating an example of a mobile terminal associated with the present invention.

Next, FIG. 3A is a front perspective view illustrating an example of the mobile terminal 100 associated with the present invention. The mobile terminal 100 disclosed herein is provided with a bar-type terminal body. However, the present invention is not limited to this, but is also applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components are incorporated into a space formed between the front case 101 and the rear case 102.

In addition, at least one middle case may be additionally disposed between the front case 101 and the rear case 102, and a battery cover 103 for covering the battery 191 may be detachably configured at the rear case 102. The cases may also be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing mechanism to receive a control command by a touch method. When a touch is made to any one place on the display unit 151, the touch sensing mechanism may be configured to sense this touch and enter the content corresponding to the touched place. The content entered by a touch method may be a text or numerical value, or a menu item capable of indication or designation in various modes.

The touch sensing mechanism may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

Sounds generated from the first audio output module 153a can also be released along an assembly gap between the structural bodies. In this instance, a hole independently formed to output audio sounds may not be seen or hidden in terms of appearance, thereby further simplifying the appearance of the mobile terminal 100. However, the present invention is not limited to this, but a hole for releasing the sounds may be formed on the window.

In addition, the first camera 121a processes video frames such as still or moving images obtained by the image sensor in a video call mode or capture mode. The processed video frames may be displayed on the display unit 151.

Further, the user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

The present drawing illustrates the first manipulation unit 131 is a touch key, but the present invention is not necessarily limited to this. For example, the first manipulation unit 131 may be configured with a mechanical key, or a combination of a touch key and a mechanical key.

In addition, the content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

Also, the microphone 122 can receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
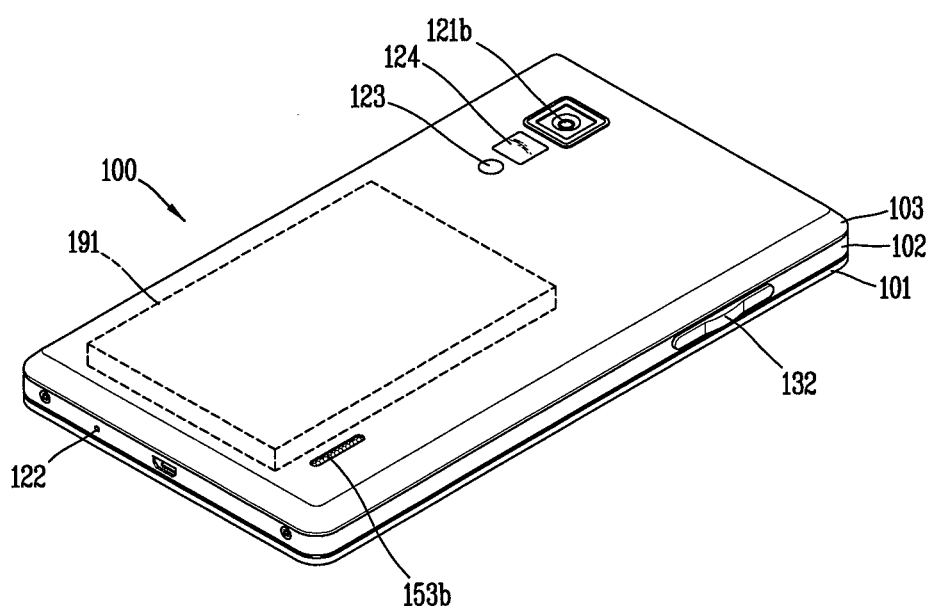
FIG. 3B is a rear perspective view illustrating a mobile terminal illustrated in FIG. 3A.

Next, FIG. 3B is a rear perspective view illustrating mobile terminal 100 illustrated in FIG. 3A. Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and pop-up manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

In addition, a power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, the battery cover 103 is combined with the rear case 102 to cover the battery 191, thereby restricting the battery 191 from being released and protecting the battery 191 from external shocks and foreign substances.

Further, the mobile terminal 100 displays information on a display screen. However, when the user wants to use the displayed information in a search, the user has to perform many different input operations including switching between background and foreground states. In other words, the user has to manipulate the terminal in a complicated manner.

Accordingly, the present invention provides a mobile terminal and corresponding control method allowing the user can control a search application in a simple manner while displaying screen information.

Next, FIG. 4 is a flow chart illustrating a mobile terminal 100 according to an embodiment of the present invention. In more detail, the present invention may be performed using an intelligent agent (IA). According to an embodiment of the present invention, the controller 180 includes such an IA.

Referring to FIG. 4, the controller 180 display screen information in the first region of the display unit 151, and displays a status display line in a second region adjacent to the first region is performed (S100).

Further, at least one of a home screen, a lock screen, and an execution screen for an application may be displayed in the first region of the display unit 151. In addition, a page containing images or text, a web page, an e-mail, e-documents, and social network service (SNS) content may be displayed in the first region of the display unit 151. That is, the screen information refers to all information displayed in at least a partial region of the display unit 151.

In addition, a status display line or indicator region may be displayed in the second region adjacent to the first region of the display unit 151. The status display line may be referred to as a "status bar," denoting a message line showing the current operation status of the mobile terminal 100. An icon corresponding to an application or an icon indicating the current setting information of the mobile terminal may be displayed on the status display line.

Further, when a touch input (for example, first drag input) to the status display line displayed in the second region is sensed, the controller 180 enlarges the size of the status display line, and displays detailed information associated with information that has been previously displayed on the enlarged status display line. For example, the controller 180 displays an icon that has been previously displayed on the enlarged status display line in an enlarged manner, or displays detailed information associated with the current operation status information. Then, when a touch input (for example, second drag input) to the enlarged status display line is sensed, the controller 180 reduces the size of the status display line again.

Next, the controller 180 extracts at least one keyword data from the screen information (S120). For example, sent and received messages may be displayed in the first region of the display unit 151. At this time, only sent messages may be displayed on one screen, or only received messages may be displayed on one screen, or both sent messages and received messages may be displayed on one screen. A pre-set number of messages may also be displayed on one screen, and the number of messages displayed on one screen can be set by the user.

In addition, the controller 180 selects a pre-set number of messages from the messages displayed in the first region of the display unit 151. For example, the controller 180 select the most recently received messages or select "n" (for example, three) of the most recently sent and received messages.

The controller 180 also analyzes text data included in a message. The message may be received as text data in the form of a natural language. Further, the controller 180 analyzes text data constituting a message using a natural language processing (NLP) algorithm.

In more detail, the natural language processing algorithm denotes an artificial intelligence technology allowing the mobile terminal 100 or computer to understand, generate and analyze human languages. Further, natural language understanding operation denotes an operation for converting a human daily life language into data that can be processed by the mobile terminal 100 or computer through formal analysis, semantic analysis, and conversation analysis.

In addition, the controller 180 analyzes text data through a natural language processing algorithm and selects keyword data from the text data using the analysis result. The controller 180 also analyzes text data constituting sent and received messages, respectively, thereby selecting at least one keyword data from the text data even when the user does not directly enter keyword data. In other words, the controller 180 can derive keyword data required by the user.

Specifically, the controller 180 understands the context of text data to select keyword data therefrom. The controller 180 also analyzes all text data displayed in the screen information or analyzes a part thereof. While sending and receiving a group message, a range of text data to be analyzed by the controller 180 varies based on the number of persons who are sending and receiving the group message.

Furthermore, the controller 180 extracts a keyword data candidate group from the text data and display the keyword data candidate group on the display unit 151 (for example, in a highlighted manner), thereby allowing the user to select at least one keyword data from the keyword data candidate group.

Then, the controller 180 performs a search process of searching information associated with the extracted keyword data (S130) and displays the search result in the second region (S140). That is, the controller 180 searches information associated with the selected keyword data.

In more detail, the controller 180 searches information associated with keyword data from the server using a search engine or search application, or otherwise searches information associated with keyword data from the memory 160 of the mobile terminal 100.

The controller 180 also displays the search result in the second region of the display unit 151, namely, on the status display line. That is, the controller 180 enlarges the size of the status display line and displays the search result on the enlarged status display line. Then, when a touch input to the search result is sensed, the controller 180 terminates the search result being displayed on the status display line, and reduces the size of the status display line again.

As described above, according to an embodiment of the present invention, the mobile terminal 100 may analyze text data constituting screen information to select keyword data, and search information associated with the keyword data. Accordingly, the mobile terminal can automatically extract a keyword even when the user does not apply an additional input thereto.

Furthermore, according to an embodiment of the present invention, the search screen of the information associated with the keyword data may be displayed along with the screen information. Accordingly, it is possible to omit a complicated process allowing the user to display a search screen. As a result, the user's convenience is enhanced.

Figure 6:
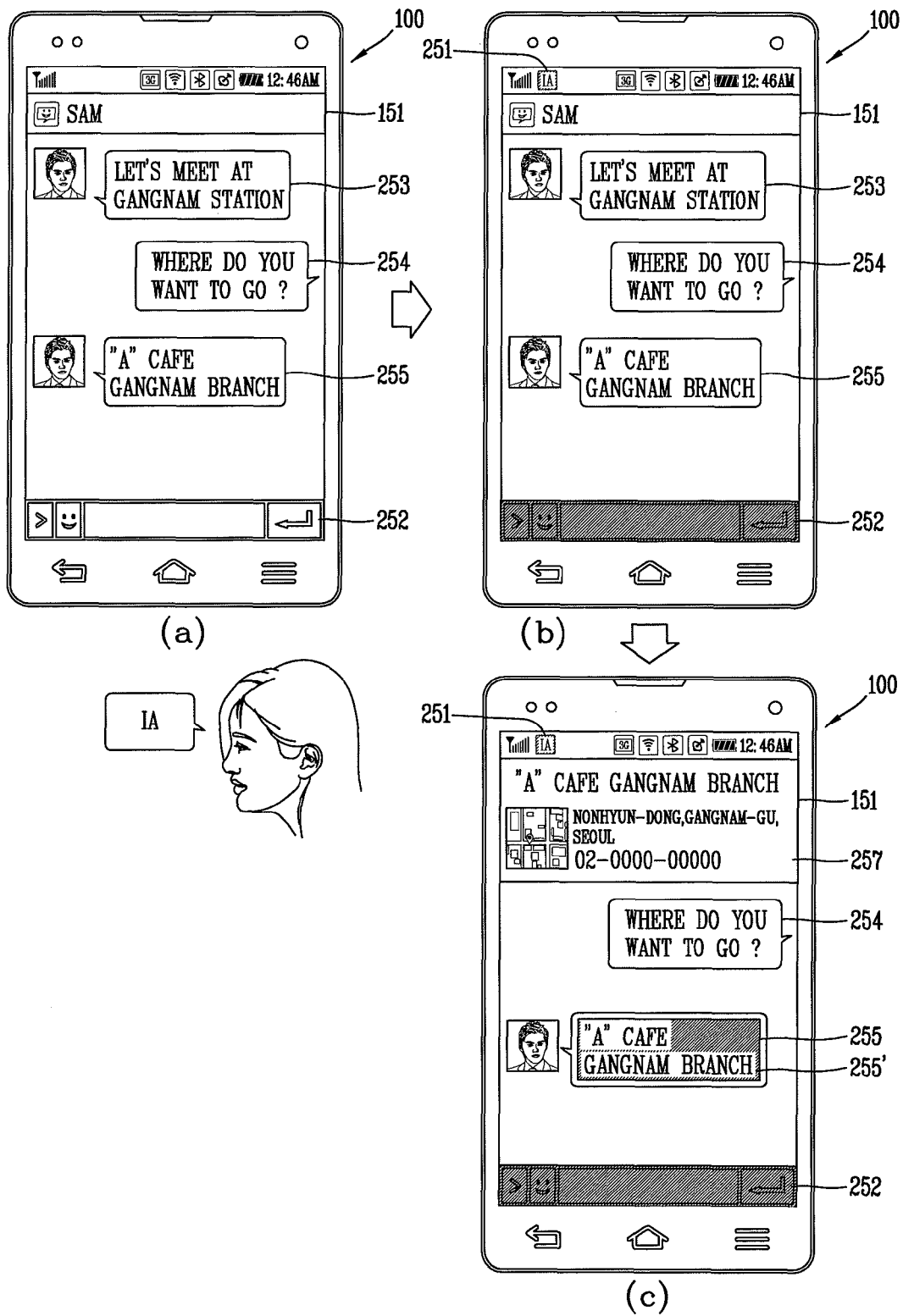

Next, FIGS. 5 and 6 are conceptual views illustrating a user interface for activating a function of extracting keyword data from screen information. Referring to FIG. 5(*a*), the wireless communication unit 110 of the mobile terminal 100 receives a message from the counterpart. The display unit 151 then displays sent and received messages in the first region, and display a status display line in the second region.

Accordingly, as illustrated in the drawing, the controller 180 displays first through third messages 253-255 containing first through third text data, respectively, in the first region. The controller 180 also displays an input window 252 capable of receiving text data in the first region.

Furthermore, as illustrated in the drawing, the controller 180 displays an icon 251 corresponding to an intelligent agent (IA) (hereinafter, referred to as a "IA icon") on the status display line.

In more detail, when the IA icon 251 is selected, the controller 180 activates a function of extracting keyword data from the screen information. Accordingly, as shown in FIG. 5(*b*), the IA icon 251 may be displayed in a highlighted manner. Furthermore, the input window 252 for receiving text data may be also displayed in a highlighted manner with the same format (for example, same color) as that of the IA icon 251.

In addition, as discussed above, the controller 180 extracts at least one keyword data from the screen information. Specifically, the controller 180 analyzes first through third text data, and selects keyword data (for example, "A" Cafe Gangnam branch) contained in the third text data using the analysis result as shown in FIG. 5.

Then, the controller 180 searches information associated with keyword data, and displays the search result 257 on the status display line. As the search result 257 is displayed on the status display line, the size of the second region can be enlarged.

Referring to FIG. 6(*a*), the microphone 122 receives audio data. When pre-set audio data (for example, "IA") is received by the microphone, the controller 180 activates a function of extracting keyword data from the screen information as illustrated in FIG. 6(*b*). The controller 180 also displays the IA icon 251 on the status display line.

In addition, when a function of extracting keyword data from screen information is activated, the controller 180 can display a description related to the function on the status display line for a pre-set period of time. The controller 180 can also display a popup window on the display unit 151 to allow the user to select whether or not to execute the function.

Referring to FIG. 6(*b*) again, the controller 180 displays the IA icon 251 and input window 252 with the same color in a highlighted manner. Then, referring to FIG. 6(*c*), the controller 180 analyzes first through third text data, and selects keyword data (for example, "A" Cafe Gangnam branch) contained in the third text data using the analysis result. Then, the controller 180 searches information associated with keyword data, and displays the search result 257 on the status display line.

Figure 7:
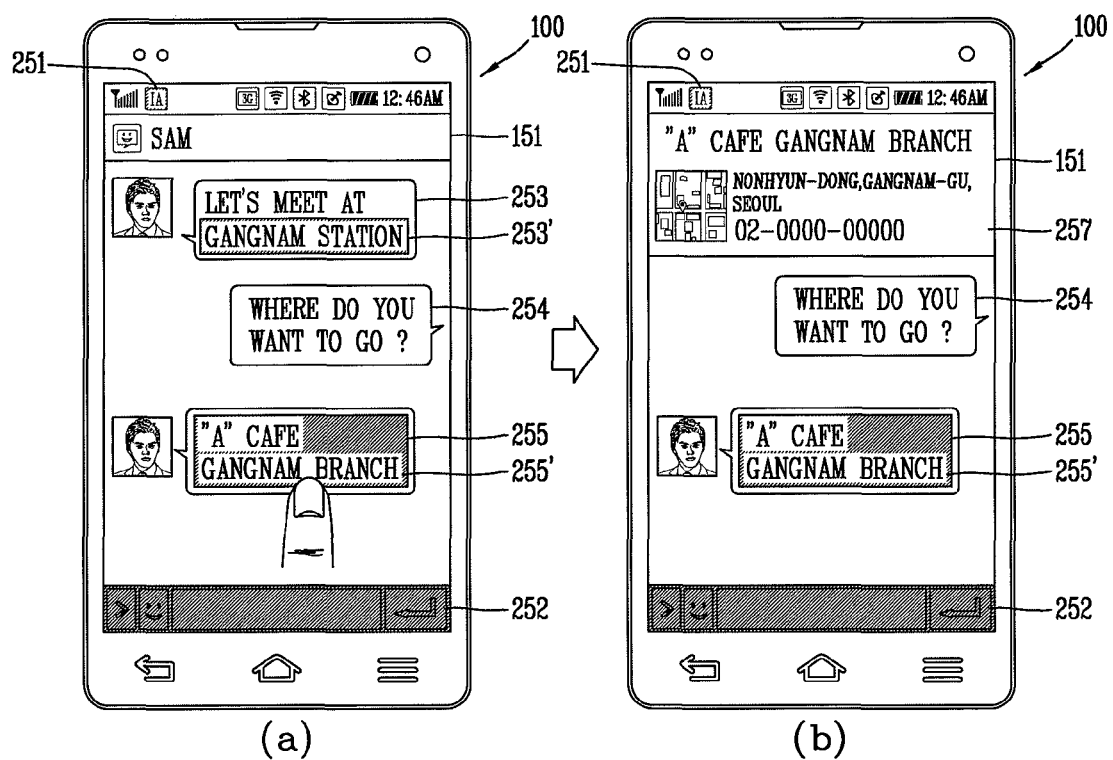
FIGS. 7 and 8 are conceptual view illustrating a user interface for a plurality of keyword data.
Figure 8:
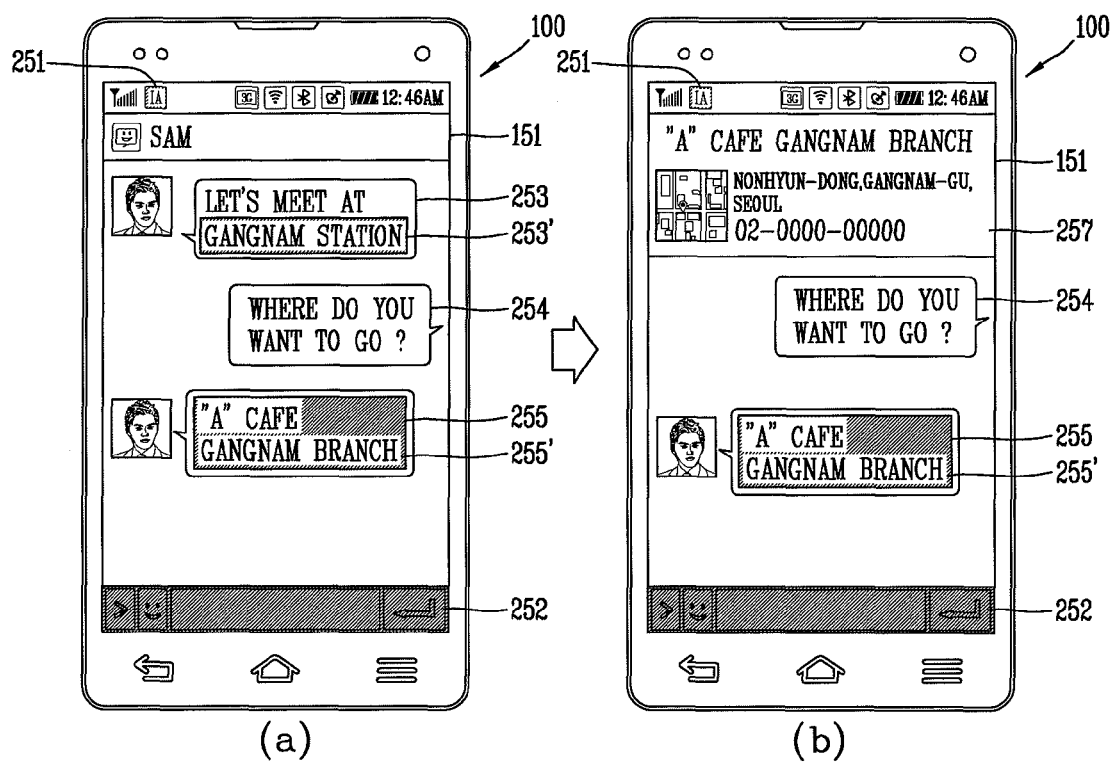

Next, FIGS. 7 and 8 are conceptual views illustrating a user interface for a plurality of keyword data. Referring to FIGS. 7(*a*) and 8(*a*), the wireless communication unit 110 receives a message from the counterpart. The display unit 151 then displays sent and received messages in the first region and displays the status display line in the second region.

Specifically, a first message 253 and a third message 255 received from the counterpart are displayed on the display unit 151. Furthermore, a second message 254 by the counterpart is also displayed on the display unit 151. As illustrated in the drawing, the controller 180 analyzes only first and third text data constituting the first and third messages 253 and 255 received from the counterpart among the first through third messages 253-255.

In addition, the controller 180 can also only analyze the second text data constituting the second message 254 sent to the counterpart, or analyze all the first through third text data constituting the first through third messages 253-255.

Further, the controller 180 extracts a keyword data candidate group from the first and third text data using the analysis result of the first and third text data. As illustrated in the drawing, the controller 180 displays the first keyword data (for example, Gangnam station) and the third keyword data (for example, "A" Cafe Gangnam branch) corresponding to the keyword data candidate group in a highlighted manner.

As illustrated in FIG. 7(*a*), when a touch input to at least one (for example, third keyword data) of the highlighted keyword data is sensed, referring to FIG. 7(*b*), the controller 180 selects the touched third keyword data. Accordingly, the controller 180 searches information associated with the third keyword data, and displays the search result 257 for the third keyword data on the status display line.

On the other hand, as illustrated in FIGS. 8(*a*) and 8(*b*), the controller 180 can select at least one keyword data from the keyword data candidate group based on use frequency information for each keyword data corresponding to the keyword data candidate group.

For example, the controller 180 selects keyword data (for example, third keyword data) with a low use frequency from the first and third keyword data using log information stored in the memory 160 of the mobile terminal 100. Accordingly, the controller 180 searches information associated with the third keyword data, and displays the search result 257 for the third keyword data on the status display line.

Although FIG. 8 illustrates the controller 180 automatically selecting at least one keyword data from a keyword data candidate group, the controller 180 can select at least one keyword data when a keyword data select icon displayed on the display unit 151 is selected.

Figure 9:
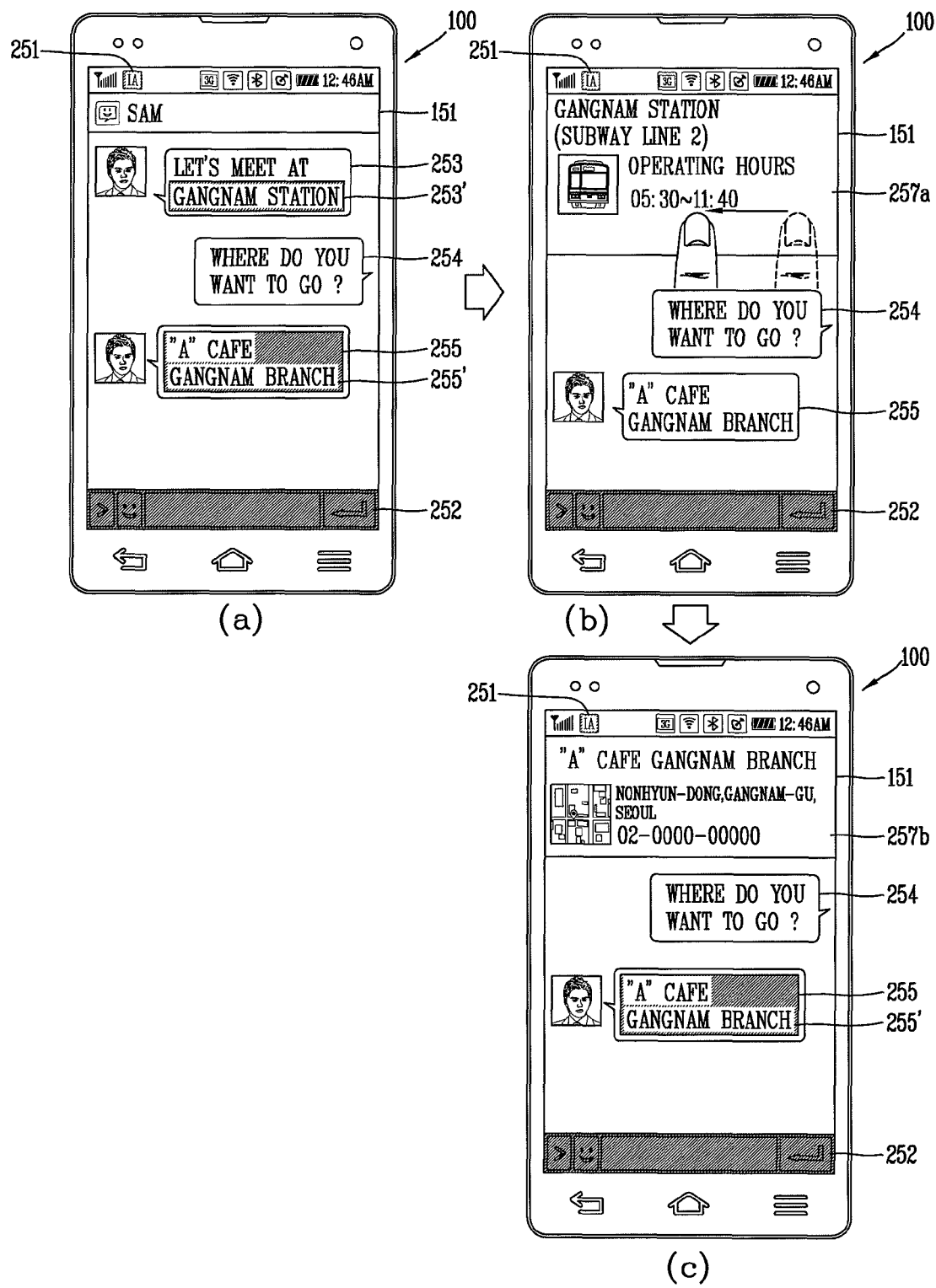
FIG. 9 is a conceptual view illustrating a user interface for a plurality of search results.

Next, FIG. 9 is a conceptual view illustrating a user interface including a plurality of search results. Referring to FIG. 9(*a*), the controller 180 extracts a plurality of keyword data (hereinafter, referred to as "first and third keyword data") from the first and third text data using the analysis result of the first and third text data. As illustrated in the drawing, the controller 180 displays the first keyword data (for example, Gangnam station) and the third keyword data (for example, "A" Cafe Gangnam branch) in a highlighted manner.

The controller 180 also searches first and third keyword data, respectively. Referring to FIG. 9(*b*), the controller 180 displays the first search result 257*a* of the first keyword data on the status display line. Also, when displaying the first search result 257*a* of the first keyword data on the status display line, the controller 180 can only display the first keyword data in a highlighted manner, and stop displaying the other keyword data in a highlighted manner.

Then, when a pre-set touch input (for example, drag input) is sensed in the first search result 257*a*, referring to FIG. 9(*c*), the controller 180 stops displaying the first search result 257*a*, and displays the third search result 257*b* of the third keyword data on the status display line. The controller 180 can also display only the third keyword data in a highlighted manner.

Figure 10:
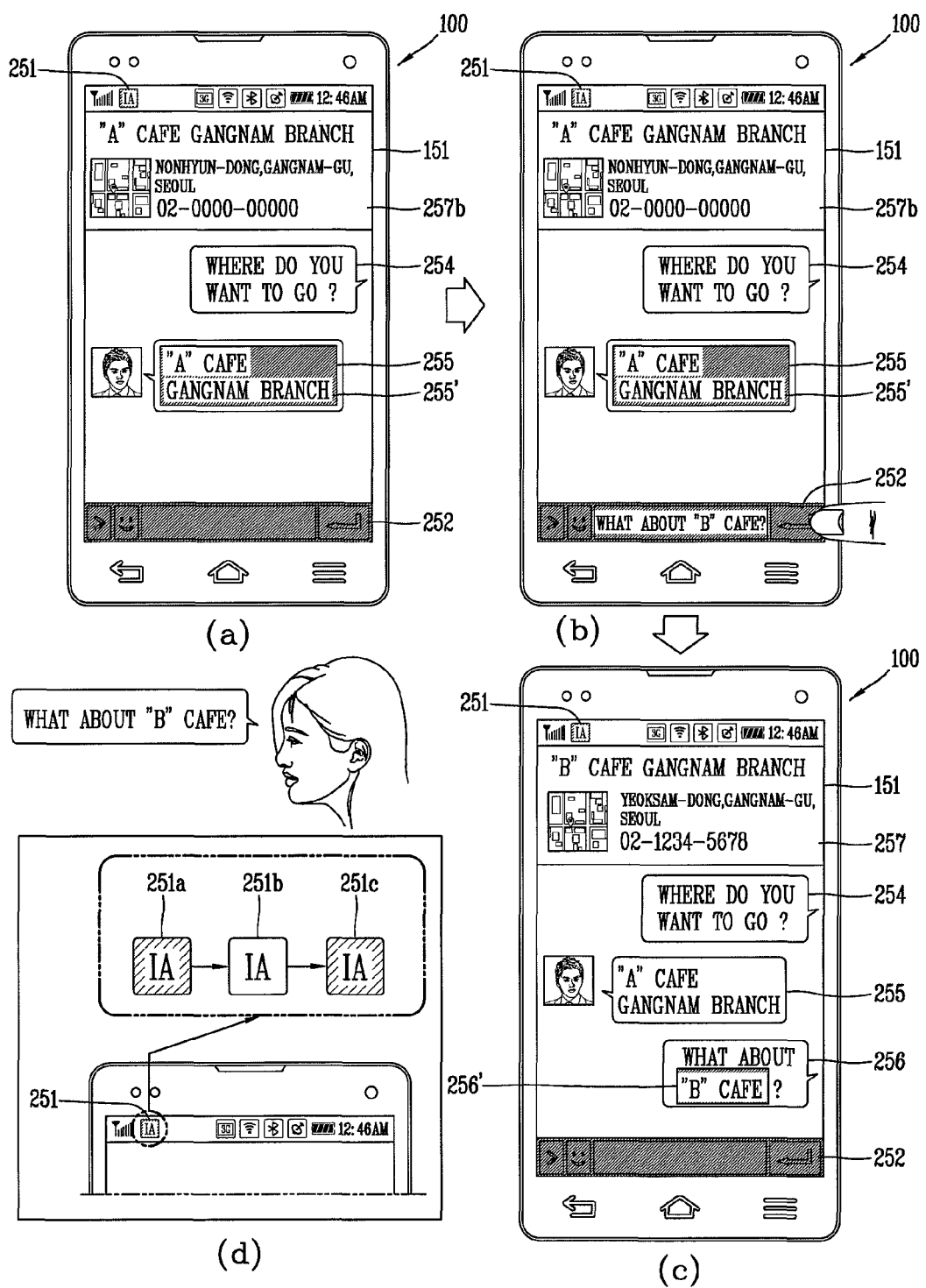
FIG. 10 is a conceptual view illustrating a user interface for outputting a notification signal notifying that audio data is being received while receiving audio data.

Next, FIG. 10 is a conceptual view illustrating a user interface for outputting a notification signal notifying that audio data is being received. Referring to FIG. 10(*a*), the microphone 122 receives audio data, and the controller 180 outputs a notification signal notifying that audio data is being received using at least one of a visual method, an auditory method and a tactile method while receiving the audio data through the microphone 122.

For example, referring to FIG. 10(*d*), the controller 180 can provide a blinking effect on the IA icon 251. Alternatively, the controller 180 can output a notification signal through the audio output unit 153, provide a blinking effect on an LED lamp provided in the main body, etc.

Next, referring to FIG. 10(*b*), the controller 180 converts audio data received through the microphone 122 into text data and displays the text data on the input window 252. Although the converted text data is displayed on the input window 252 in the drawing, the controller 180 can display the converted text data in the second region, namely, on the status display line. In this instance, the controller 180 analyzes the converted text data, extracts keyword data according to the analysis result, and displays the extracted keyword data in a highlighted manner.

Referring to FIG. 10(b) again, when an input command is applied to the input window 252, the controller 180 displays a new message (hereinafter, referred to as a "fourth message") 256 in the first region of the display unit 151 as illustrated in FIG. 10(c). The controller 180 analyzes the fourth text data contained in the fourth message, and extracts keyword data (for example, "B" Cafe) from the fourth text data.

The controller 180 also searches the extracted keyword data, and displays the search result 257 in the second region. Furthermore, as illustrated in the drawing, the controller 180 displays the extracted keyword data in a highlighted manner.

Figure 11:
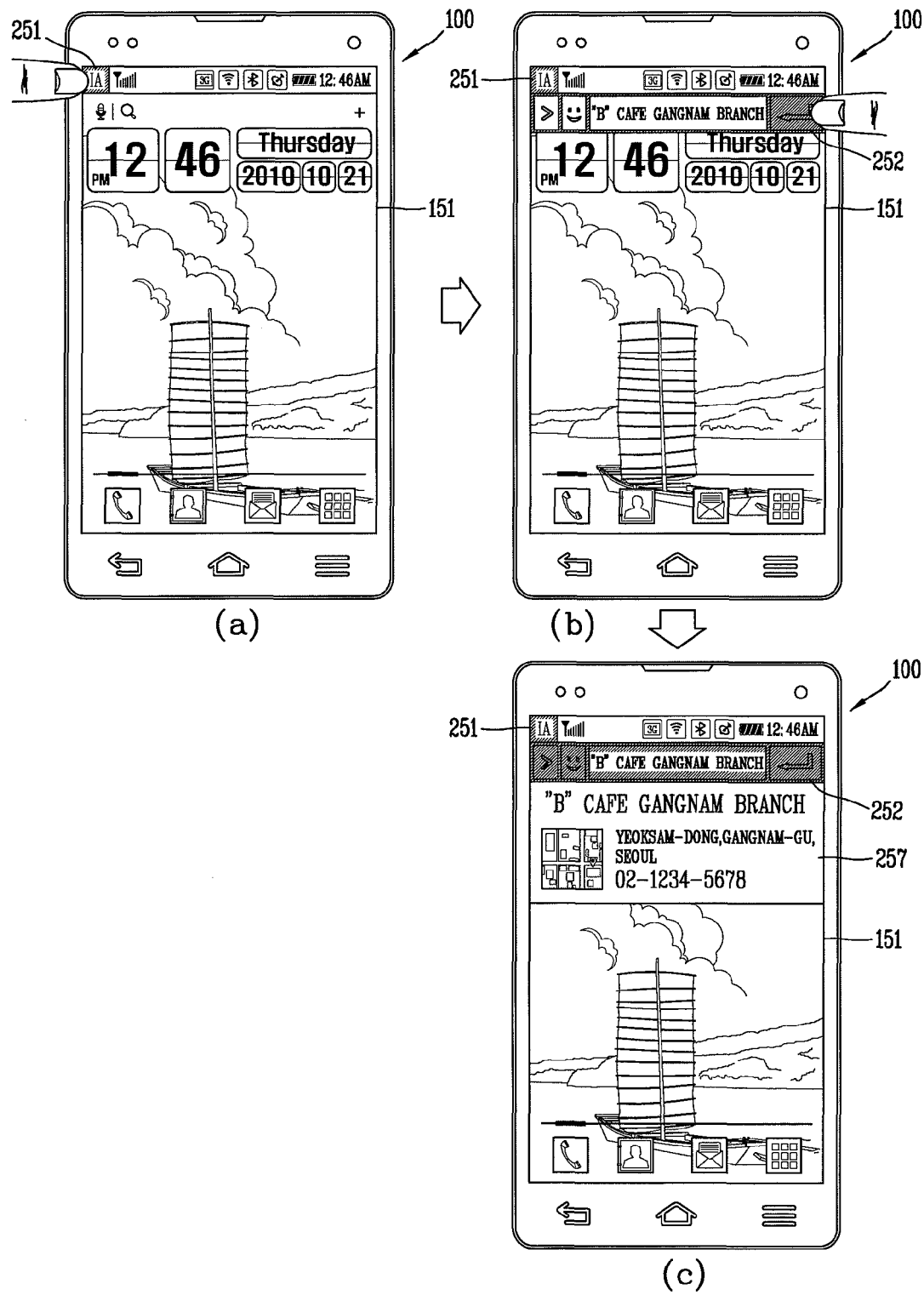
FIGS. 11 and 12 are conceptual views illustrating a user interface when an IA icon displayed on the status display line is selected.
Figure 12:
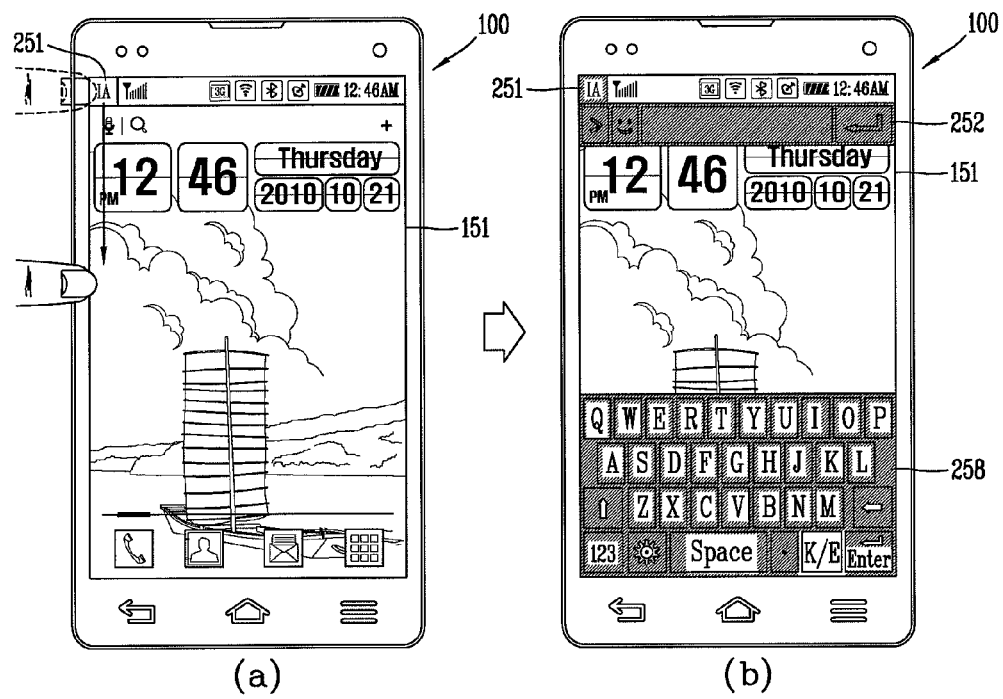

Next, FIGS. 11 and 12 are conceptual views illustrating a user interface when an IA icon displayed on the status display line is selected. Referring to FIG. 11(a), the display unit 151 can display the home screen in the first region, and display the status display line in the second region. The IA icon 251 can also be displayed on the status display line.

When the IA icon 251 is selected, as illustrated in FIG. 11(b), the controller 180 enlarges the size of the status display line, and displays the input window 252 for receiving text data on the status display line. As illustrated in the drawing, the input window 252 may be displayed in a highlighted manner with the same format (for example, same color) as that of the IA icon 251.

When text data is received on the input window 252, as illustrated in FIG. 11(c), the controller 180 searches the received text data. Then, the controller 180 enlarges the size of the status display line, and displays the search result 257 on the status display line. On the other hand, the search result 257 may be also displayed with the same format (for example, same color) as that of the IA icon 251.

Referring to FIG. 12(a), when a pre-set touch input (for example, drag input) to the IA icon 251 displayed on the status display line is sensed, the controller 180 enlarges the size of the status display line and displays the input window 252 for receiving text data on the status display line as illustrated in FIG. 12(b). Furthermore, the controller 180 display a virtual keypad 258 in the first region of the display unit 151.

As illustrated in the drawing, the input window 252 and the virtual keypad 258 may be displayed in a highlighted manner with the same format (for example, same color) as that of the IA icon 251. On the other hand, when a pre-set touch input (for example, drag input) to the IA icon 251 is sensed or another control command is sensed, the controller 180 allows the input window 252 and the virtual keypad 258 to disappear from the display unit 151. The controller 180 also stops displaying the IA icon 251 in a highlighted manner.

Furthermore, when the input window 252 and the virtual keypad 258 are displayed on the display unit 151, the controller 180 stores information that has been received through the input window 252 and the virtual keypad 258 in the memory 160.

On the other hand, when displaying a virtual keypad for performing other operations unrelated to extracting and searching for keywords, the controller 180 displays the virtual keypad in a non-highlighted manner. Accordingly, the virtual keypad 258 for performing the operation related to the present invention may be distinguished from a virtual keypad for performing other operations.

Figure 13:
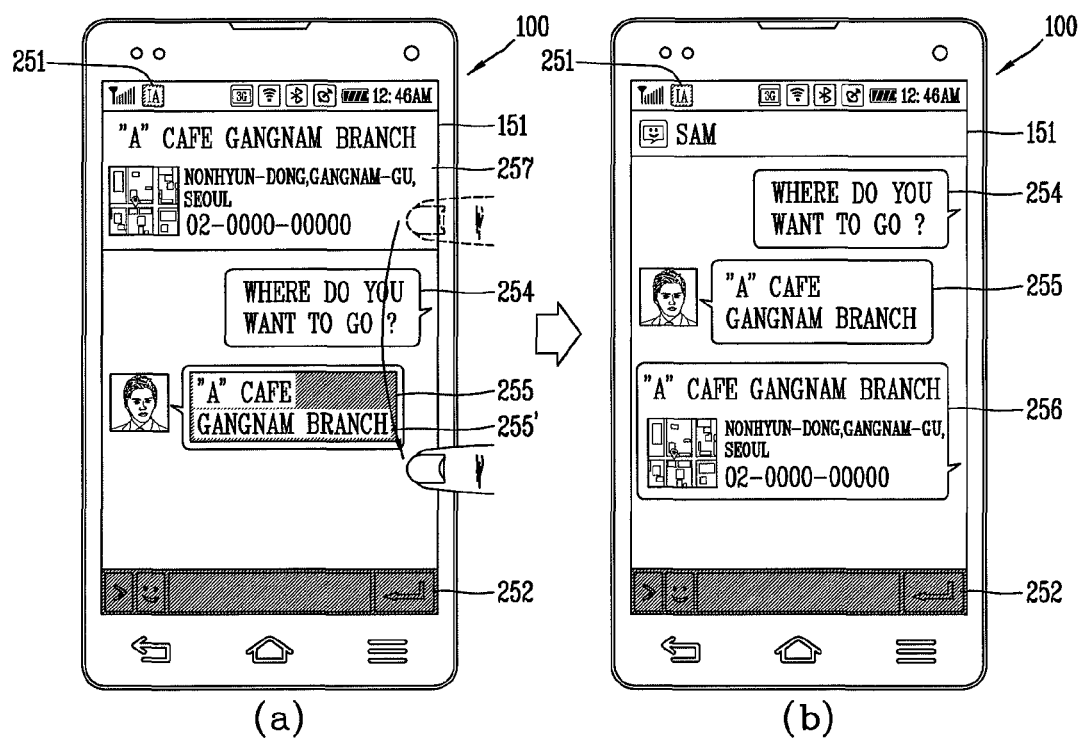
FIGS. 13 and 14 are conceptual views illustrating a user interface shared with the search result.
Figure 14:
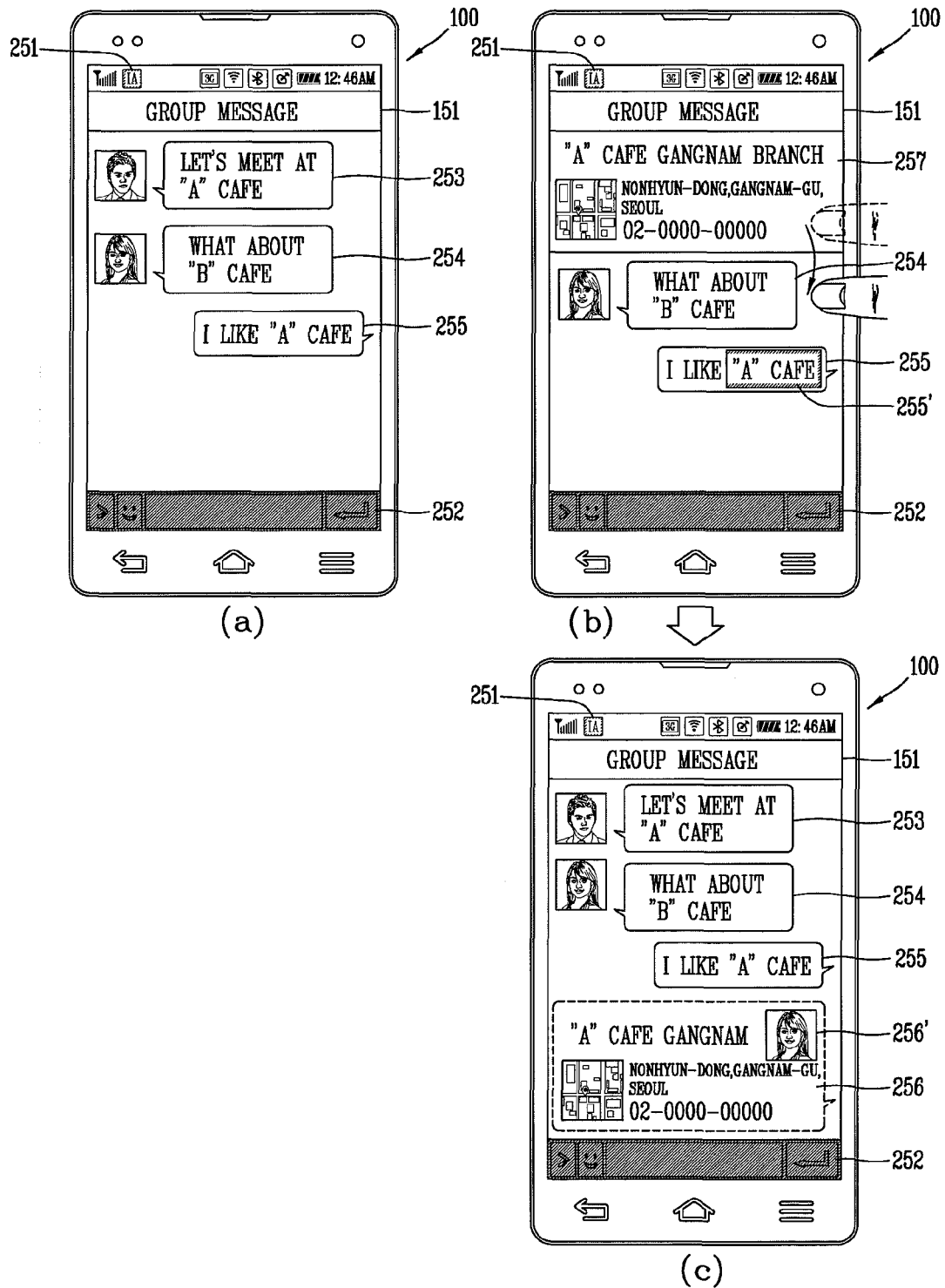

Next, FIGS. 13 and 14 are conceptual views illustrating a user interface shared with the search result. Referring to FIG. 13(a), the display unit 151 may display sent and received messages in the first region, and display the status display line in the second region. At this time, the IA icon 251 may be displayed on the status display line.

The controller 180 displays the search result 257 related to screen information on the status display line. When a pre-set touch input (for example, drag input toward the first region) is sensed on the search result 257, referring to FIG. 13(b), the controller 180 inserts the search result 257 into a message to be sent to the counterpart.

Accordingly, as illustrated in the drawing, the controller 180 displays a new message sent to the counterpart (hereinafter, referred to as a "fourth message") 256 in the first region of the display unit 151. The fourth message 256 includes a search result that has been displayed on the status display line.

Referring to FIG. 14(a), the wireless communication unit 110 transmits and receives a group message to and from a plurality of counterparts. The display unit 151 then displays a plurality of group messages (hereinafter, referred to as "first through third messages") 253-255 in the first region.

The controller 180 analyzes first through third text data constituting the first through third messages 253-255. The controller 180 then extracts a keyword data candidate group using the analysis result of the first through third text data to search one keyword data (for example, "A" Cafe) from them.

Referring to FIG. 14(b), the controller 180 displays the search result 257 on the status display line. When the search result 257 is dragged in any one direction (for example, second message 254) of the first through third messages 253-255, the controller 180 inserts the search result 257 into a message to be sent to the counterpart to whom the second message 254 has been sent as illustrated in FIG. 14(c).

Accordingly, as illustrated in the drawing, the controller 180 displays a new message that has been sent to the counterpart (hereinafter, referred to as a "fourth message") 256 in the first region of the display unit 151. The fourth message 256 includes the search result that has been displayed on the status display line.

Furthermore, as illustrated in the drawing, the fourth message 256 may be displayed to be distinguished from other messages (for example, dotted line). In addition, information (for example, thumbnail image) 256' for the counterpart that has received the fourth message 256 may be displayed in the fourth message 256.

Figure 15:
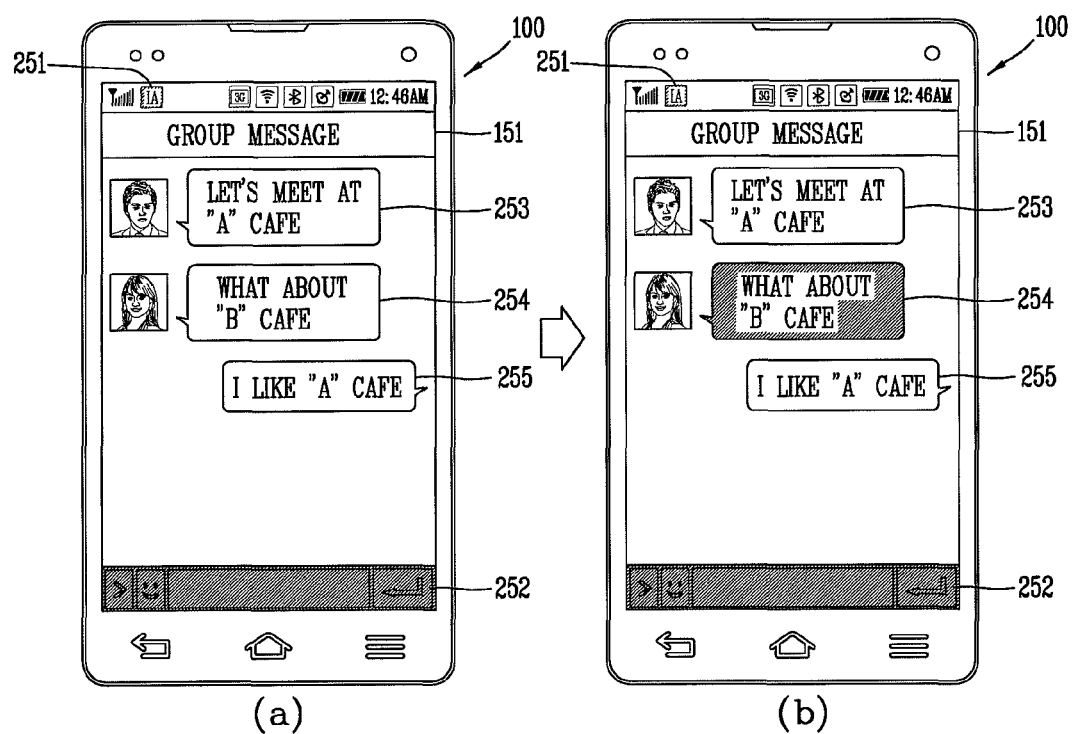
FIG. 15 is a conceptual view illustrating a user interface for outputting a notification signal notifying that the counterpart is searching a keyword when the counterpart is searching information associated with screen information.

Next, FIG. 15 is a conceptual view illustrating a user interface for outputting a notification signal notifying that the counterpart is searching a keyword. Referring to FIG. 15(a), while the user sends and receives a group message, the controller 180 displays a plurality of group messages, namely, first through third messages 253-255.

When at least one of a plurality of counterparts is searching information associated with keyword data from the screen information displayed with a group message, the controller 180 outputs a notification signal notifying that at least one of the plurality of counterparts is searching a keyword.

For example, referring to FIG. 15(b), the controller 180 displays the second message 254 in a highlighted manner to notify that the counterpart who has sent the second message 254 among the plurality of counterparts is currently searching a keyword.

Also, a keyword data being searched by the counterpart who has sent the second message 254 may be displayed on the display unit 151 for a pre-set period of time. Furthermore, the counterpart who has sent the second message 254 searches a keyword data, and then the search result may be displayed on the display unit 151 for a pre-set period of time. Furthermore, the controller 180 can display a thumbnail image of the counterpart who has sent the second message 254 in a highlighted manner.

Figure 16:
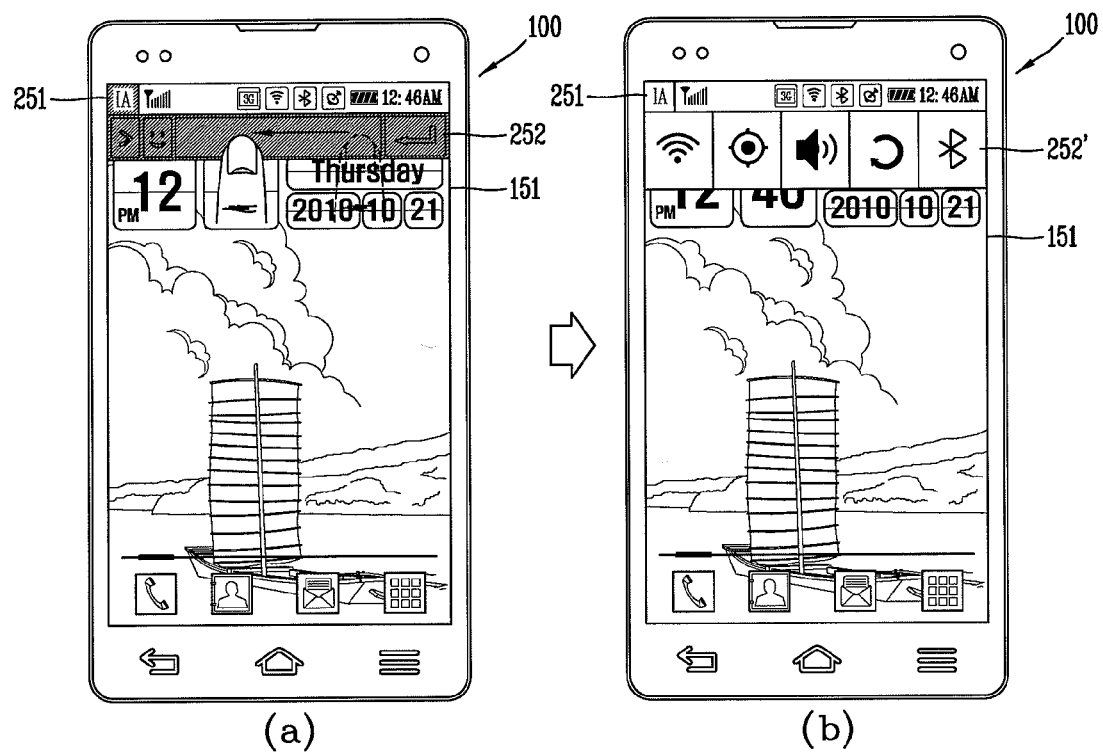
FIG. 16 is a conceptual view illustrating a user interface in which a plurality of status display lines are overlapped.

Next, FIG. 16 is a conceptual view illustrating a user interface including a plurality of status display lines in an overlapping manner. In more detail, the controller 180 displays a first status display line displayed with the status information 252' of the terminal body and a second status display line displayed with the IA icon 251 and the input window 252 to be overlapped in the second region, and changes the order in which the first and the second status display line are overlapped based on a touch input to the second region.

Specifically, referring to FIG. 16(*a*), the display unit 151 may display the home screen in the first region, and display the second status display line in the second region. The IA icon 251 and the input window 252 may also be displayed in the second status display line. As illustrated in the drawing, the IA icon 251 and the input window 252 may be displayed in a highlighted manner with the same color.

When a pre-set touch input (for example, drag input) is sensed in the second region, referring to FIG. 16(*b*), the controller 180 changes the order in which the first and the second status display lines are overlapped. Accordingly, as illustrated in the drawing, the first status display line displayed with the status information 252' of the terminal body may be displayed in the foreground, and the second status display line may disappear.

On the other hand, as illustrated in the drawing, as the second status display line displayed with the IA icon 251 disappears, the controller 180 stops displaying the IA icon 251 in a highlighted manner.

Thus, the present invention provides several advantages. For example, the user can easily search for information included in a display screen. Therefore, the user does not have to execute a separate application associated with the screen information in the background and execute a search application in the foreground. In other words, the user can operate the terminal in a simple manner.

Furthermore, according to an embodiment of present invention, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented for transmission via the Internet.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
   a wireless communication unit configured to wirelessly communicate with at least one other terminal;
   a display unit configured to display screen information in a first region, and display an indicator area in a second region adjacent to the first region, wherein the screen information displayed in the first region includes a plurality of messages exchanged between the mobile terminal and the at least one other terminal via the wireless communication unit; and
   a controller configured to:
   extract at least one keyword data from the plurality of messages included in the screen information displayed in the first region,
   perform a search operation using the extracted keyword data,
   display a result of the search operation in the second region,
   display a first status display line displayed with the status information of the mobile terminal and a second status display line different from the first status line to be overlapped in the second region, and
   change an order in which the first and the second status display lines are overlapped based on a touch input to the second region.

2. The mobile terminal of claim 1, wherein the controller is further configured to:
   display an icon corresponding to an intelligent agent (IA) used to perform the search operation in the second region,
   receive an input selecting the displayed icon, and
   perform the search operation and display the result of the search operation when the icon is selected.

3. The mobile terminal of claim 1, further comprising:
   a microphone configured to receive a voice input to perform the search operation, and
   perform the search operation and display the result of the search operation when the voice input is received through the microphone.

4. The mobile terminal of claim 3, wherein the controller is further configured to display an icon corresponding to an intelligent agent (IA) used to perform the search operation in the second region when the voice input is received.

5. The mobile terminal of claim 1, wherein the controller is further configured to:
   select at least a first message from the messages displayed in the first region,
   extract at least one keyword data from the first message,
   perform the search operation using the extracted keyword data from the first message, and
   display the result of the search operation in the second region.

6. The mobile terminal of claim 5, wherein the controller is further configured to extract said at least one keyword data from the first message based on how frequent a keyword has been used in previous messages.

7. The mobile terminal of claim 5, wherein the controller is further configured to:

select a second message from the messages displayed in the first region, extract at least one keyword data from the second message, perform the search operation using the extracted keyword data from the second message, and selectively display the result of the search operation in the second region for the first and second messages.

8. The mobile terminal of claim 7, wherein the first and second messages are from the at least one other terminal.

9. The mobile terminal of claim 3, wherein after the controller performs the search operation using the extracted keyword data and displays the result of the search operation in the second region, the controller is further configured to receive the voice input, convert the received voice input into text data, extract at least one keyword from the text data, perform an additional search operation using the extracted keyword data and selectively display the result of the additional search operation in the second region.

10. The mobile terminal of claim 2, wherein when the icon is selected, the controller is further configured to display an input window and a virtual keypad for inputting text data on the display unit, and display the input window and the virtual keypad with a same color as that of the icon.

11. The mobile terminal of claim 1, wherein the controller is further configured to receive a touch input of the search result displayed in the second region, insert the search result into a message, and send the message with the search result to the at least one other terminal.

12. The mobile terminal of claim 1, wherein the screen information displayed in the first region includes a plurality of messages exchanged between the mobile terminal and a plurality of other terminals, and wherein when a counterpart of another terminal is performing the search operation, the controller is further configured to output a notification signal indicating the counterpart is performing the search operation.

13. A method of controlling a mobile terminal, the method comprising:

allowing, via a wireless communication unit, wireless communication with at least one other terminal;

displaying, via a display unit, screen information in a first region, and displaying an indicator area in a second region adjacent to the first region, wherein the screen information displayed in the first region includes a plurality of messages exchanged between the mobile terminal and the at least one other terminal via the wireless communication unit;

extracting, via a controller, at least one keyword data from the plurality of messages included in the screen information displayed in the first region;

performing, via the controller, a search operation using the extracted keyword data;

displaying, via the display unit, a result of the search operation in the second region;

displaying, via the display unit, a first status display line displayed with the status information of the mobile terminal and a second status display line different from the first status line to be overlapped in the second region; and changing, via the controller, an order in which the first and the second status display lines are overlapped based on a touch input to the second region.

14. The method of claim 13, further comprising:

displaying, via the display unit, an icon corresponding to an intelligent agent (IA) used to perform the search operation in the second region;

receiving an input selecting the displayed icon; and performing, via the controller, the search operation and display the result of the search operation when the icon is selected.

15. The method of claim 13, further comprising:

receiving, via a microphone, a voice input to perform the search operation; and performing, via the controller, the search operation and display the result of the search operation when the voice input is received through the microphone.

16. The method of claim 15, further comprising:

displaying, via the display unit, an icon corresponding to an intelligent agent (IA) used to perform the search operation in the second region when the voice input is received.

17. The method of claim 13, wherein the screen information displayed in the first region includes a plurality of messages exchanged between the mobile terminal and the at least one other terminal, and wherein the method further comprises:

selecting at least a first message from the messages displayed in the first region;

extracting at least one keyword data from the first message;

performing the search operation using the extracted keyword data from the first message; and displaying the result of the search operation in the second region.

18. The method of claim 17, further comprising:

extracting, via the controller, said at least one keyword data from the first message based on how frequent a keyword has been used in previous messages.

* * * * *